United States Patent
Gopalakrishnan et al.

(10) Patent No.: US 10,490,226 B2
(45) Date of Patent: Nov. 26, 2019

(54) METADATA RECORDATION AND NAVIGATION FOR STITCHED CONTENT

(71) Applicant: ARRIS Enterprises LLC, Suwanee, GA (US)

(72) Inventors: Veerabadhran Gopalakrishnan, Tamil Nadu (IN); Lakshmi Arunkumar, Bangalore (IN); S. Subbarayan, Bangalore (IN); Virendra Singh, Bangalore (IN); Rajasekhar Babburi, Andhra Pradesh (IN)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 15/552,131

(22) PCT Filed: Jul. 19, 2016

(86) PCT No.: PCT/US2016/042964
§ 371 (c)(1),
(2) Date: Aug. 18, 2017

(87) PCT Pub. No.: WO2017/015284
PCT Pub. Date: Jan. 26, 2017

(65) Prior Publication Data
US 2018/0122426 A1    May 3, 2018

(51) Int. Cl.
H04N 9/80    (2006.01)
G11B 27/32    (2006.01)
G11B 27/00    (2006.01)
H04N 5/93    (2006.01)
H04N 5/783    (2006.01)

(52) U.S. Cl.
CPC .......... *G11B 27/327* (2013.01); *G11B 27/005* (2013.01); *G11B 27/329* (2013.01)

(58) Field of Classification Search
USPC .......................... 386/241, 239, 248, 278, 343
See application file for complete search history.

(56) References Cited

U.S. PATENT DOCUMENTS

| | | | |
|---|---|---|---|
| 8,532,195 B2* | 9/2013 | Bushell | H04N 19/46 375/240.25 |
| 9,454,399 B2* | 9/2016 | Iwata | G06F 9/505 |
| 2014/0016910 A1* | 1/2014 | Yu | H04N 9/87 386/234 |

* cited by examiner

*Primary Examiner* — Daquan Zhao
(74) *Attorney, Agent, or Firm* — Bart A. Perkins (57) ABSTRACT

Methods, systems, and computer readable media described herein may facilitate the detection and use of stitch points during trickplay navigation of a content stream. A multimedia device may automatically detect stitch points in a transport stream based upon PTS (presentation time stamp) discontinuities. The multimedia device may generate a slot table that organizes the frames of a piece of content into segments having sequential or linear PTS values. The multimedia device may compare a target PTS to the various PTS ranges of the slot table to identify a region to be searched for a metadata index associated with the target PTS. Once the target PTS is mapped to the appropriate metadata index, the multimedia device may fetch the appropriate frame for presentation.

15 Claims, 7 Drawing Sheets

FIG. 7

METADATA RECORDATION AND NAVIGATION FOR STITCHED CONTENT

CROSS REFERENCE TO RELATED APPLICATION

This application is a non-provisional application claiming the benefit of Indian Provisional Application No. 800/KOL/2015, entitled "Accurate DVR Reposition for Stitched MPEG Transport Streams," which was filed on Jul. 22, 2015, and is incorporated herein by reference in its entirety.

TECHNICAL FIELD

This disclosure relates to navigating stitched content based upon recorded metadata that is associated with the content.

BACKGROUND

Most set-top boxes (STB) provide mechanisms for a user to seek to a desired point in a recorded content. The user can use a trickplay function to skip or jump to a specific point within a piece of content during playback of the content. The STB will typically carry out the trickplay function by identifying a resume point that is determined relative to a current PTS (presentation time stamp). Generally, the STB relies on PTS values of frames of a piece of content being sequential in order to accurately identify a resume point or frame. However, not all pieces of content have linear or sequential PTS values throughout the content. Some pieces of content may have discontinuities in PTS values. For example, stitched content (e.g., content including stitched components such as banners, short clips, etc.) may have PTS discontinuities at content boundaries where content segments have been added to a broader, encompassing piece of content. The PTS discontinuities may create a mismatch in mapping the PTS of a frame to the metadata entry, in which case the navigation system of the STB may break down and the content repositioning becomes inaccurate. Therefore, a need exists for methods and systems operable to facilitate playback repositioning resulting from a trickplay operation carried out on a piece of content.

BRIEF DESCRIPTION OF THE DRAWINGS

Like reference numbers and designations in the various drawings indicate like elements.

DETAILED DESCRIPTION

As a preliminary matter, it readily will be understood by those persons skilled in the art that the present invention is susceptible of broad utility and application. Many methods, embodiments and adaptations of the present invention other than those herein described, as well as many variations, modifications, and equivalent arrangements, will be apparent from or reasonably suggested by the present invention and the following description thereof, without departing from the substance or scope of the present invention.

Accordingly, while the present invention has been described herein in detail in relation to preferred embodiments, it is to be understood that this disclosure is only illustrative and exemplary of the present invention and is made merely for the purposes of providing a full and enabling disclosure of the invention. The disclosure is not intended nor is to be construed to limit the present invention or otherwise to exclude any such other embodiments, adaptations, variations, modifications and equivalent arrangements, the present invention being limited only by the claims appended hereto and the equivalents thereof.

It is desirable to provide methods and systems operable to facilitate playback repositioning resulting from a trickplay operation carried out on a piece of content. Methods, systems, and computer readable media described herein may facilitate the detection and use of stitch points during trickplay navigation of a content stream. A multimedia device may automatically detect stitch points in a transport stream based upon PTS (presentation time stamp) discontinuities. The multimedia device may generate a slot table that organizes the frames of a piece of content into segments having sequential or linear PTS values. The multimedia device may compare a target PTS to the various PTS ranges of the slot table to identify a region to be searched for a metadata index associated with the target PTS. Once the target PTS is mapped to the appropriate metadata index, the multimedia device may fetch the appropriate frame for presentation.

It should be understood that the methods, systems, and computer readable media described herein may work equally well with either in-home DVR (digital video recorder) or with network-based DVR (e.g., nDVR (network DVR)). Network DVR (nDVR) storage has the benefit of keeping metadata files in the cloud. In-home DVR may be supplemented with nDVR, thereby allowing metadata files and slot tables to be moved to cloud storage. This enables permanent storage, even if the in-home DVR is replaced.

An embodiment of the invention described herein may include a method comprising: (a) receiving a target presentation time stamp; (b) identifying a slot entry of a slot table, the slot entry having a presentation time stamp range within which the target presentation time stamp falls; (c) among a first index of the identified slot entry and the last index of the identified slot entry, identifying the index that is associated with a presentation time stamp value that is nearest to the target presentation time stamp; (d) based on the value of the target presentation time stamp relative to the value of the presentation time stamp associated with the identified index, determining a direction for carrying out a search of one or more indexes of the slot entry; (e) comparing the target presentation time stamp to one or more presentation time stamps associated with one or more indexes of the identified slot entry starting with the identified index and proceeding sequentially from the identified index in the determined direction until an index having a presentation time stamp matching the target presentation time stamp is found; and (f) identifying the index having the presentation time stamp that matches the target presentation time stamp as a target index.

According to an embodiment of the invention, determining a direction for carrying out the search of one or more indexes of the slot entry comprises: (a) if the target presentation time stamp is not greater than the presentation time stamp associated with the identified index, comparing the target presentation time stamp to one or more presentation time stamps associated with one or more indexes of the identified slot entry starting with the identified index and proceeding sequentially from the identified index in a direction in which presentation time stamps of indexes are decreasing until an index having a presentation time stamp matching the target presentation time stamp is found; and (b) if the target presentation time stamp is not less than the presentation time stamp associated with the identified index, comparing the target presentation time stamp to one or more presentation time stamps associated with one or more indexes of the identified slot entry starting with the identified index and proceeding sequentially from the identified index in a direction in which presentation time stamps of indexes are increasing until an index having a presentation time stamp matching the target presentation time stamp is found.

According to an embodiment of the invention, the method described herein further comprises, retrieving a frame for presentation, the frame being associated with the index identified as the target index.

According to an embodiment of the invention, the slot table comprises a plurality of slot entries, wherein each respective one slot entry of the plurality of slot entries comprises information associated with one or more metadata file indexes that are between a strategic point and another strategic point or content boundary.

According to an embodiment of the invention, the at least one strategic point is identified as a strategic point index within the metadata file.

According to an embodiment of the invention, the strategic point is recognized when a discontinuity in presentation time stamp values occurs.

According to an embodiment of the invention, the strategic point index comprises an identification of a presentation time stamp value associated with a preceding frame, a presentation time stamp value associated with a following frame, and an identification of the location of a previous strategic point index within the metadata file.

According to an embodiment of the invention, the method described herein further comprises: (a) determining that a presentation time stamp value of a last queried index falls within the presentation time stamp range associated with the identified slot entry; and (b) wherein the index that is associated with a presentation time stamp value that is nearest to the target presentation time stamp is identified from among the last queried index, a first index of the identified slot entry, and the last index of the identified slot entry.

An embodiment of the invention described herein may include an apparatus comprising one or more modules configured to: (a) receive a target presentation time stamp; (b) identify a slot entry of a slot table, the slot entry having a presentation time stamp range within which the target presentation time stamp falls; (c) among a first index of the identified slot entry and the last index of the identified slot entry, identify the index that is associated with a presentation time stamp value that is nearest to the target presentation time stamp; (d) based on the value of the target presentation time stamp relative to the value of the presentation time stamp associated with the identified index, determine a direction for carrying out a search of one or more indexes of the slot entry; (e) compare the target presentation time stamp to one or more presentation time stamps associated with one or more indexes of the identified slot entry starting with the identified index and proceeding sequentially from the identified index in the determined direction until an index having a presentation time stamp matching the target presentation time stamp is found; and (f) identify the index having the presentation time stamp that matches the target presentation time stamp as a target index.

According to an embodiment of the invention, the one or more modules are further configured to retrieve a frame for presentation, the frame being associated with the index identified as the target index.

An embodiment of the invention described herein may include one or more non-transitory computer readable media having instructions operable to cause one or more processors to perform the operations comprising: (a) receiving a target presentation time stamp; (b) identifying a slot entry of a slot table, the slot entry having a presentation time stamp range within which the target presentation time stamp falls; (c) among a first index of the identified slot entry and the last index of the identified slot entry, identifying the index that is associated with a presentation time stamp value that is nearest to the target presentation time stamp; (d) based on the value of the target presentation time stamp relative to the value of the presentation time stamp associated with the identified index, determining a direction for carrying out a search of one or more indexes of the slot entry; (e) comparing the target presentation time stamp to one or more presentation time stamps associated with one or more indexes of the identified slot entry starting with the identified index and proceeding sequentially from the identified index in the determined direction until an index having a presentation time stamp matching the target presentation time stamp is found; and (f) identifying the index having the presentation time stamp that matches the target presentation time stamp as a target index.

According to an embodiment of the invention, the instructions are further operable to cause one or more processors to perform the operations comprising: retrieving a frame for presentation, the frame being associated with the index identified as the target index.

According to an embodiment of the invention, the instructions are further operable to cause one or more processors to perform the operations comprising: (a) determining that a presentation time stamp value of a last queried index falls within the presentation time stamp range associated with the identified slot entry; and (b) wherein the index that is associated with a presentation time stamp value that is nearest to the target presentation time stamp is identified from among the last queried index, a first index of the identified slot entry, and the last index of the identified slot entry.

Figure 1:
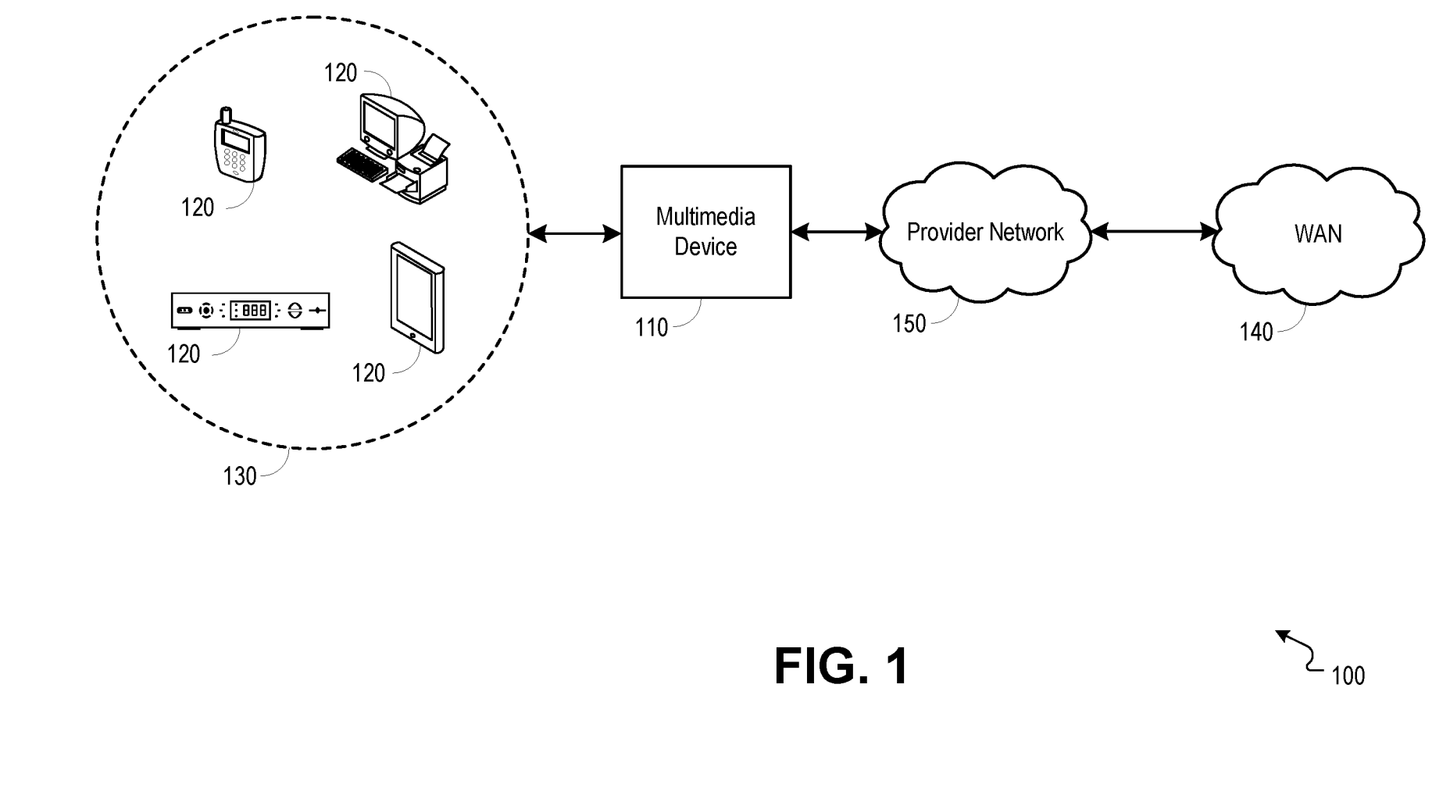
FIG. 1 is a block diagram illustrating an example network environment operable to facilitate the detection and use of stitch points during trickplay navigation of a content stream.

FIG. 1 is a block diagram illustrating an example network environment 100 operable to facilitate the detection and use of stitch points during trickplay navigation of a content stream. In embodiments, a multimedia device 110 may be configured to provide multimedia services to one or more client devices 120. The multimedia device 110 may include a multimedia or residential gateway, a set-top box (STB), or any other device configured to receive, store, and/or deliver multimedia content to one or more client devices 120. Client devices 120 may include televisions, computers, tablets, mobile devices, STBs, game consoles, and any other device configured to receive a multimedia service.

In embodiments, multimedia content may be delivered from a multimedia device 110 to one or more client devices 120 over a local network 130 (e.g., a local area network (LAN), a wireless local area network (WLAN), a personal area network (PAN), etc.). The multimedia device 110 may receive services from and may communicate with an upstream wide area network (WAN) 140 through a connection to a provider network 150. It should be understood that the multimedia device 110 may operate as an access point to wirelessly deliver multimedia content to one or more client devices 120 that are associated with the multimedia device 110 as stations.

In embodiments, a multimedia device 110 may communicate with a client device 120 over a wired or a wireless connection. The multimedia device 110 may provide one or more channels or service sets through which services and communications may be delivered wirelessly to one or more client devices 120. A client device 120 may associate and authenticate with a multimedia device 110 or associated access point (e.g., wireless router, network extender, etc.), after which communications and services may be delivered from the multimedia device 110 to the client device 120. It should be understood that various protocols and/or standards (e.g., Wi-Fi, multimedia over coax alliance (MoCA), Zig-Bee, etc.) may be used to deliver communications between a multimedia device 110 and client device 120.

A multimedia device 110 may output live or linear content to a client device 120 as the content is received at the multimedia device 110, or the multimedia device 110 may store content and output the stored content to a client device 120 at a later time. For example, content may be transcoded and stored at the multimedia device 110, wherein the content is conditioned or transcoded into a format that is compatible with one or more client devices 120. In embodiments, the multimedia device 110 may be configured to record and store one or more programs for later viewing by a user. For example, the multimedia device 110 may autonomously, or in response to a user request, record and store content received at the multimedia device 110 within local or remote storage (e.g., DVR, network DVR (nDVR), etc.).

In embodiments, trickplay controls (i.e., record, stop, fast-forward, reverse, skip forward, skip backward, pause, play, etc.) associated with a multimedia device 110 or other display device (e.g., client device 120) may be used to initiate and/or manipulate playback of linear content or recorded content that is output from the multimedia device 110. Trickplay controls allow a user to control playback repositioning within a piece of content. For example, a trickplay request may cause the multimedia device 110 to temporarily cease a linear playback of content and identify a new position within the content from which to resume linear playback.

In embodiments, when content is recorded at a multimedia device 110, metadata for each frame of the content may be prepared and stored by the multimedia device 110 for use in navigating through the content. The metadata may be stored in a separate file apart from the actual content. The metadata may include a presentation time stamp (PTS) for each frame of the content, and the PTS values may aid in reposition or trickplay functionality. For example, the PTS value of a currently viewed frame may be used to retrieve the navigation position from metadata during playback, thereby allowing the identification of the relative frame to be presented next.

Navigation of a piece of content may be carried out by a multimedia device 110 using a mapping between PTS values of the frames making up the content and frame metadata. In embodiments, the multimedia device 110 may be configured to recognize discontinuities in the PTS values of the content frames, to generate a PTS-to-index map that considers the recognized discontinuities, and to navigate the piece of content using the PTS-to-index map. Such PTS discontinuities may exist in stitched content (e.g., a piece of content that includes multiple pieces of content, with one or more of the pieces of content including different, non-sequential PTS value ranges). For example, stitching of content may be accomplished at strategic points as dictated by user experience, legal/regulatory obligations, or other requirements. The components of the stitched piece of content may be encoded separately and then stitched together, and the time stamps (e.g., PTS, DTS (decode time stamp), etc.) of the stitched content may become discontinuous across the strategic points.

A special metadata entry may be created for a strategic point within a stitched piece of content. In embodiments, the metadata entry for a strategic point may include information associated with a preceding PTS value (e.g., PTS value of the frame preceding the strategic point), information associated with a following PTS value (e.g., PTS value of the frame following the strategic point), an index to a previous strategic point, and/or other information. The entry for the strategic point may be of the same size as other entries within the metadata file (e.g., metadata entries for the frames of the content). In embodiments, the index to a previous strategic point may be an invalid value (e.g., a negative integer) when no strategic point exists before the strategic point associated with the entry, and the index to a previous strategic point may identify the index number of the preceding strategic point when a strategic point does exist before the strategic point associated with the entry.

In embodiments, the multimedia device 110 may monitor PTS values of each frame or section of data received. If there is any deviation detected in consecutive PTS values beyond a threshold limit, then that point may be marked as a strategic point, and a strategic point entry may be inserted between the two PTS range entries (e.g., between the frames creating the PTS value deviation). If the multimedia device 110 recognizes a change in the tuned service or a PMT (program map table) version with a different service number or video PID, then the point at which the change was recognized may be marked as a strategic point and stored along with metadata for reference.

In embodiments, the multimedia device 110 may use the strategic points in a metadata file to identify the start position and the direction of a search for a metadata index associated with a target PTS. The multimedia device 110 may generate a slot table, wherein each entry within the slot table is associated with a slot, the slot comprising metadata entries between a strategic point and another strategic point or other content boundary. The slot table may include a plurality of entries, and each entry may include a slot identifier, a first index and a last index of the slot, an identification of the PTS value associated with the first index of the slot, and an identification of the PTS value associated with the last index of the slot.

Organizing the metadata using the slots creates a segregation of metadata entries such that within a given slot, the PTS values increment linearly. When a target PTS is received at a multimedia device 110, the multimedia device 110 may identify a slot from the slot table that has a PTS range within which the target PTS falls. Once the slot of the target PTS is identified, then the search for the target PTS can be performed based on the best suited starting point and the direction of a search. For example, the multimedia device 110 can identify a starting search index and direction of search based on the proximity of the PTS target to a plurality of known PTS values that fall within the PTS range of the identified slot. Once the search start index and search direction are identified, then every metadata index from the start index may be read by the multimedia device 110 sequentially until the metadata index with the target PTS is obtained. Using the slot table, the multimedia device 110 may accurately map the target PTS to the corresponding frame metadata, thus helping the multimedia device 110 to fetch the correct frame from a storage media for presentation.

The slot table may be created by the multimedia device 110 as a onetime activity during the start of the playback of a piece of content by reading the entries in the metadata file associated with the piece of content. The slot table may be used by the multimedia device 110 to locate the index of the metadata file having the target PTS. The slot table may include the PTS and metadata index values at the boundaries of each content slot. Once the slot is identified, the target PTS can be searched within these boundaries.

In embodiments, where the metadata index of a piece of content continues to grow during playback of the recording, the multimedia device 110 may be configured to modify the slot table by adding a slot number for each new strategic point added in the metadata file. Whenever there is a change in the input values for a given slot, the multimedia device 110 may make corresponding modifications to the slot table. The multimedia device 110 may create the slot table with the latest strategic point being listed first and providing a reference index to the previous strategic point, thus the slot table may include slot entries listed from the latest strategic point to the earliest strategic point within the piece of content.

Figure 2:
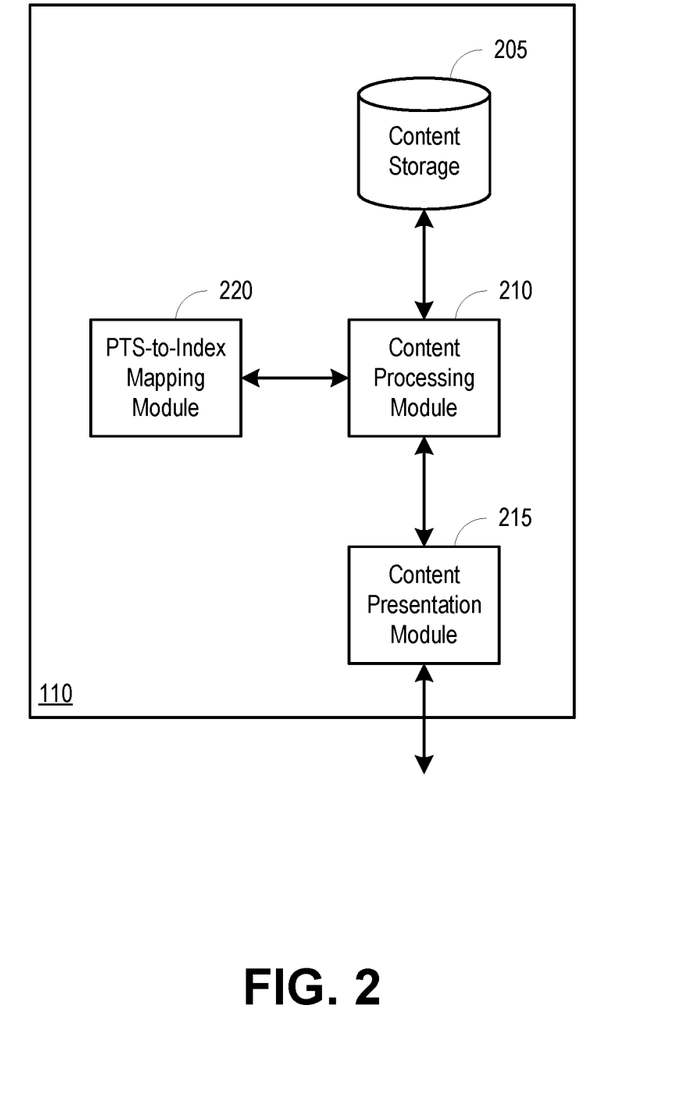
FIG. 2 is a block diagram illustrating an example multimedia device operable to facilitate the detection and use of stitch points during trickplay navigation of a content stream.

FIG. 2 is a block diagram illustrating an example multimedia device 110 operable to facilitate the detection and use of stitch points during trickplay navigation of a content stream. The multimedia device 110 may include content storage 205, a content processing module 210, a content presentation module 215, and a PTS-to-index mapping module 220. The multimedia device 110 may be a multimedia or residential gateway, a set-top box (STB), or any other device configured to receive, store, and/or deliver multimedia content to one or more client devices 120 of FIG. 1.

In embodiments, the multimedia device 110 may communicate with one or more client devices 120 over a wired or a wireless connection through a client interface. The multimedia device 110 may output content and/or other services to client devices 120 through a client interface and may receive requests for content and/or other upstream communications through the client interface. It should be understood that the client interface may include various wired and/or wireless interfaces using various protocols and/or standards (e.g., Wi-Fi, multimedia over coax alliance (MoCA), ZigBee, Ethernet, etc.) that may be used to deliver communications between a multimedia device 110 and client device(s) 120. For example, the multimedia device 110 may communicate with one or more client devices 120 over a local network 130 of FIG. 1.

In embodiments, content may be received at the multimedia device 110 from an upstream network (e.g., provider network 150 of FIG. 1, WAN 140 of FIG. 1, etc.) through a network interface. Communications and services received through the network interface may be forwarded to one or more client devices 120 through the client interface. For example, content streams (e.g., live or linear content, VoD (video-on-demand) content, recorded content, etc.) may be recorded by the multimedia device 110 and stored at content storage 205, and/or the content streams may be forwarded to one or more client devices 120 through the client interface. The multimedia device 110 may include one or more live off disk (LOD) buffers (e.g., at content storage 205), and content streams received at the multimedia device 110 may be temporarily stored or buffered within the LOD buffer(s).

In embodiments, the output of content (e.g., both recorded and linear content) may be controlled by user requests received from a control device (e.g., RCU (remote control unit)) through a control interface. For example, the user may control playback, trickplay, and recording functions at the multimedia device 110 using various buttons at a control device (e.g., record, play, fast-forward, rewind, skip, and other trickplay controls).

Navigation of a piece of content may be carried out by the content processing module 210 using a mapping between PTS values of the frames making up the content received by the multimedia device 110 and frame metadata. In embodiments, the PTS-to-index mapping module may be configured to recognize discontinuities in the PTS values of the content frames, to generate a PTS-to-index map that considers the recognized discontinuities, and to navigate the piece of content using the PTS-to-index map. For example, the PTS-to-index mapping module 220 may create a special metadata entry for a strategic point within a piece of content. In embodiments, the metadata entry for a strategic point may include information associated with a preceding PTS value (e.g., PTS value of the frame preceding the strategic point), information associated with a following PTS value (e.g., PTS value of the frame following the strategic point), an index to a previous strategic point, and/or other information.

In embodiments, the PTS-to-index mapping module 220 may monitor PTS values of each frame or section of data received. If there is any deviation detected in consecutive PTS values beyond a threshold limit, then that point may be marked as a strategic point, and a strategic point entry may be inserted between the two PTS range entries (e.g., between the frames creating the PTS value deviation). If the PTS-to-index mapping module 220 recognizes a change in the tuned service or a PMT (program map table) version with a different service number or video PID, then the point at which the change was recognized may be marked as a strategic point and stored along with metadata for reference.

In embodiments, the PTS-to-index mapping module 220 may use the strategic points in a metadata file to identify the start position and the direction of a search for a metadata index associated with a target PTS. The PTS-to-index mapping module 220 may generate a slot table, wherein each entry within the slot table is associated with a slot, the slot comprising metadata entries between a strategic point and another strategic point or content boundary. The slot table may include a plurality of entries, and each entry may include a slot identifier, a first index and a last index of the slot, an identification of the PTS value associated with the first index of the slot, and an identification of the PTS value associated with the last index of the slot.

When a target PTS is received at the multimedia device 110, the PTS-to-index mapping module 220 may identify a slot from the slot table that has a PTS range within which the target PTS falls. Once the slot of the target PTS is identified, then the search for the target PTS can be performed by the PTS-to-index mapping module 220 based on the best suited starting point and the direction of a search. For example, the PTS-to-index mapping module 220 can identify a starting search index and direction of search based on the proximity of the PTS target to a plurality of known PTS values that fall within the PTS range of the identified slot. Once the search start index and search direction are identified, then every metadata from the start index may be read by the PTS-to-index mapping module 220 sequentially until the metadata with the target PTS is obtained. Using the slot table, the PTS-to-index mapping module 220 may accurately map the target PTS to the corresponding frame metadata, thus helping the content processing module 210 to fetch the correct frame from content storage 205 for presentation to a viewer through the content presentation module 215.

Figure 3:
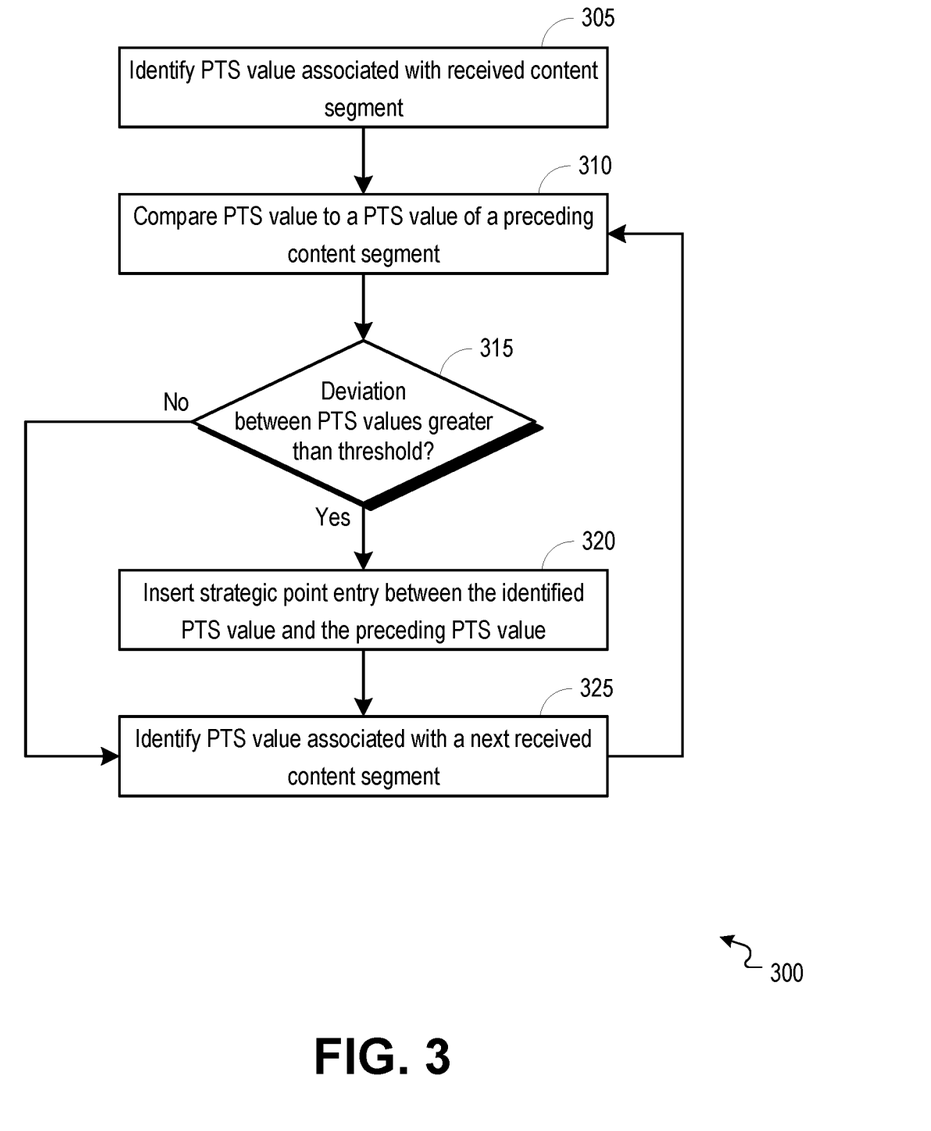
FIG. 3 is a flowchart illustrating an example process operable to facilitate the detection and marking of strategic points within a content stream based on PTS deviations.

FIG. 3 is a flowchart illustrating an example process 300 operable to facilitate the detection and marking of strategic points within a content stream based on PTS deviations. The process 300 may begin at 305 when a PTS value associated with a received content segment is identified. The PTS value associated with a received content segment (e.g., frame, data section, etc.) may be identified, for example, by a multimedia device 110 of FIG. 1 (e.g., by a content processing module 210 of FIG. 2) receiving the content stream and/or providing the content stream to a client device 120 of FIG. 1. In embodiments, the received content segment may be a component of a content stream received at the multimedia device 110 from an upstream network element (e.g., provider network 150 of FIG. 1) or may be a component of a content stream retrieved from storage that is internal (e.g., content storage 205 of FIG. 2) or external to the multimedia device 110. The PTS value associated with the received content segment may be carried by the segment (and/or associated content stream) within metadata. The process 300 may be carried out by a multimedia device 110 upon a received transport stream while the transport stream is being recorded by the multimedia device 110.

At 310, the identified PTS value may be compared to a PTS value associated with a preceding content segment. The PTS value may be compared to the PTS value of the preceding content segment, for example, by the multimedia device 110 (e.g., at the content processing module 210). In embodiments, the multimedia device 110 may maintain a file that includes metadata information associated with the segments of content received at the multimedia device 110. The metadata may include PTS values of previously received segments of a piece of content.

At 315, a determination may be made whether there is a deviation between the identified PTS value and the PTS value of the preceding content segment that is greater than a predetermined threshold. The determination whether a deviation greater than the threshold exists may be made, for example, by the multimedia device 110 (e.g., at the content processing module 210). The multimedia device 110 may be configured with one or more predetermined deviation thresholds that are designed to provide an indication of different content sections (e.g., the boundary of a section of stitched content).

If, at 315, the determination is made that there is a deviation between the identified PTS value and the PTS value of the preceding content segment that is greater than a predetermined threshold, the process 300 may proceed to 320. At 320, a strategic point entry may be inserted between the identified PTS value and the preceding PTS value. For example, the strategic point may be inserted by the multimedia device as an entry within a metadata file. The metadata file may include an index entry for each segment of the associated piece of content received at the multimedia device 110, and the multimedia device 110 (e.g., the PTS-to-index mapping module 220) may create an index entry within the metadata file for the strategic point. The index entry for the strategic point may be inserted between an index entry associated with the preceding content segment and an index entry associated with the received content segment. In embodiments, the strategic point entry may include an identification of a preceding PTS value (e.g., PTS value associated with a preceding frame), an identification of a next PTS value (e.g., PTS value associated with a following frame), and index to a preceding strategic point (if available), and/or other information.

If, at 315, the determination is made that there is not a deviation between the identified PTS value and the PTS value of the preceding content segment that is greater than a predetermined threshold, the process 300 may proceed to 325. At 325, a PTS value associated with a next received content segment may be identified. For example, the multimedia device 110 (e.g., at the content processing module 210) may identify the PTS value from metadata associated with the next received/retrieved segment of the piece of content.

Figure 4:
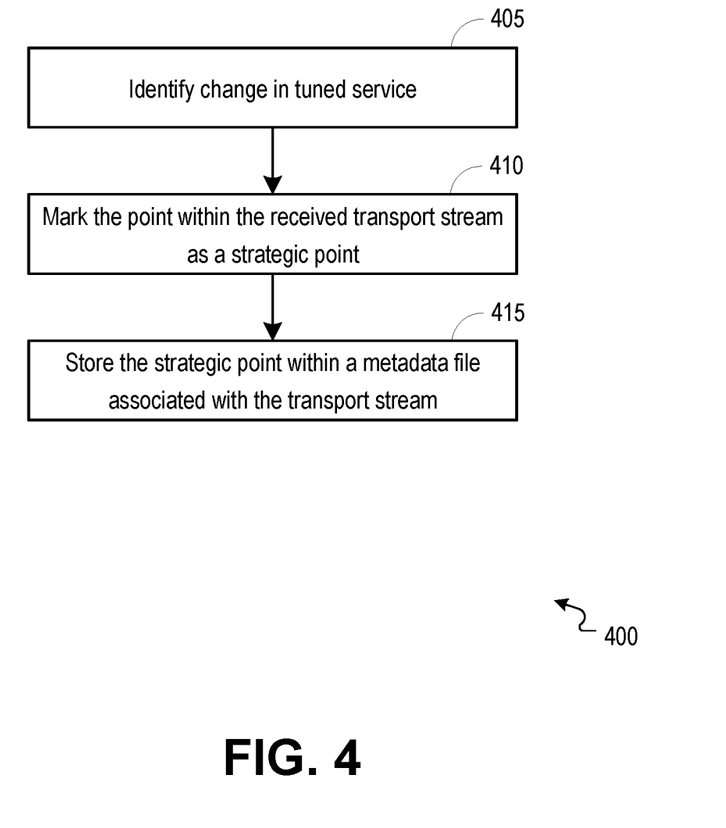
FIG. 4 is a flowchart illustrating an example process operable to facilitate the detection and marking of strategic points within a content stream based on a service change.

FIG. 4 is a flowchart illustrating an example process 400 operable to facilitate the detection and marking of strategic points within a content stream based on a service change. The process 400 may begin at 405 when a change in tuned service is identified. The change in tuned service may be identified, for example, by a multimedia device 110 of FIG. 1 (e.g., by a content processing module 210 of FIG. 2) receiving the content stream and/or providing the content stream to a client device 120 of FIG. 1. The change in tuned service may be a tuning change, a recognition of a change in PMT (program map table) version, change in video PID (packet identifier), or change in other designated content stream parameter. The process 400 may be carried out by a multimedia device 110 during a recording of linear content and/or during LOD (live off disk) buffering of received content.

At 410, the point of the change in tuned service within the received transport stream may be marked as a strategic point. The point may be marked as a strategic point, for example, by the multimedia device 110 of FIG. 1 (e.g., by a content processing module 210 of FIG. 2). In embodiments, the strategic point may separate a PTS range associated with the section of content received by the multimedia device 110 immediately prior to the change in tuned service from a PTS range associated with a section of content received by the multimedia device 110 immediately following the change in tuned service.

At 415, the strategic point may be stored within a metadata file associated with the transport stream that is received at the multimedia device 110. For example, the strategic point entry may be inserted between the PTS range associated with the section of content received by the multimedia device 110 immediately prior to the change in tuned service and the PTS range associated with a section of content received by the multimedia device 110 immediately following the change in tuned service. The metadata file may include an index entry for each segment of the associated piece of content received at the multimedia device 110, and the multimedia device 110 (e.g., the PTS-to-index mapping module 220) may create an index entry within the metadata file for the strategic point. In embodiments, the strategic point entry may include an identification of a preceding PTS value, an identification of a next PTS value, and index to a preceding strategic point (if available), and/or other information.

Figure 5:
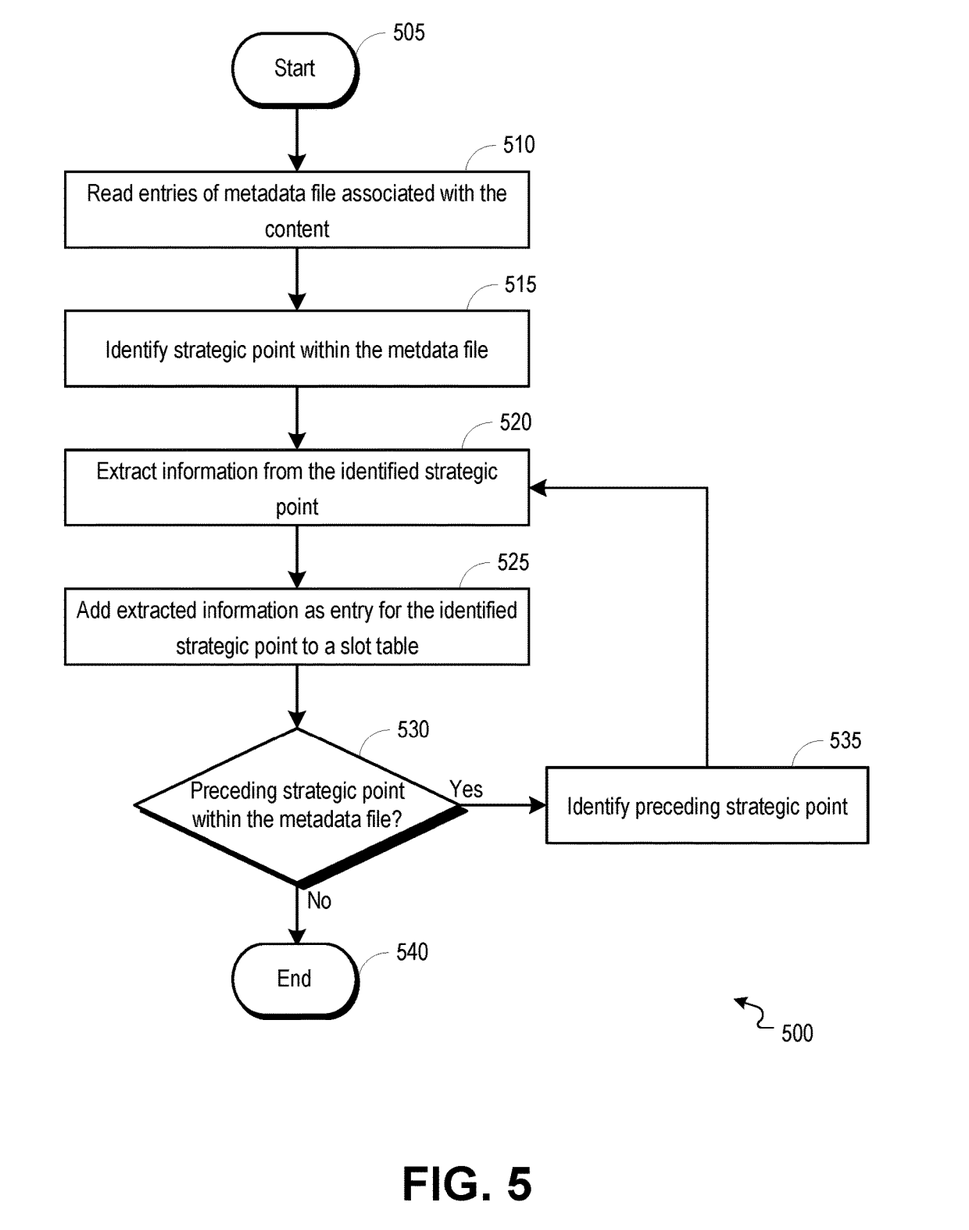
FIG. 5 is a flowchart illustrating an example process operable to facilitate the generation of a slot table for use in trickplay navigation of a piece of content.

FIG. 5 is a flowchart illustrating an example process 500 operable to facilitate the generation of a slot table for use in trickplay navigation of a piece of content. The process 500 may begin at 505 when playback of a piece of content is initiated or when a metadata index is added to a metadata file during playback of a piece of content. The process 500 may be carried out on a piece of content by a multimedia device 105 of FIG. 1.

At 510, entries of a metadata file associated with the piece of content that is being played back may be read. The entries of the metadata file may be read, for example, by the PTS-to-index mapping module 220 of FIG. 2. In embodiments, each entry of the metadata file may include a segment type (e.g., frame, packet, strategic point, etc.), an index number, a PTS value, an identification of a previous strategic point index, and/or other information.

At 515, a strategic point may be identified within the metadata file. The strategic point may be identified, for example, by the PTS-to-index mapping module 220. In embodiments, the strategic point may be the last strategic point within the metadata file and may be identified based upon an identifier designating an entry as a strategic point index, a PTS value discontinuity, or other information providing an indication that an entry is associated with a strategic point index.

At 520, information may be extracted from the identified strategic point. The information may be extracted from the identified strategic point, for example, by the PTS-to-index mapping module 220. In embodiments, the information may be extracted from a metadata index entry associated with the strategic point and may include an index number, a PTS field that identifies the PTS value of the index entry immediately preceding the strategic point index and the PTS value of the index entry immediately following the strategic point index.

At 525, the information extracted from the strategic point may be added as an entry for the identified strategic point to a slot table. The information may be added to the slot table, for example, by the PTS-to-index mapping module 220. In embodiments, the entry for the strategic point may include a slot number, an identification of a first and last index of the slot associated with the strategic point, an identification of a PTS value associated with the first index of the slot, an identification of the PTS value associated with the last index of the slot, and/or other information. The information added to the entry may be determined based upon information extracted from the identified strategic point and an identification of a content boundary or other strategic point following the identified strategic point.

At 530, a determination may be made whether a preceding strategic point exists within the metadata file. The determination may be made, for example, by the PTS-to-index mapping module 220. In embodiments, the PTS-to-index mapping module 220 may read the preceding entries of the metadata file in search of an entry identified as a strategic point index preceding the identified strategic point, or the PTS-to-index mapping module 220 of FIG. 2 may determine whether a preceding strategic point exists within the metadata file based upon a previous strategic point index value extracted from the identified strategic point. For example, an extracted previous strategic point index having a valid value (e.g., a positive integer) may indicate that a strategic point index does precede the identified strategic point, and an extracted previous strategic point index having an invalid value (e.g., −1 or other designated value) may indicate that no strategic point index precedes the identified strategic point.

If, at 530, the determination is made that a preceding strategic point exists within the metadata file, the process 500 may proceed to 535. At 535, the preceding strategic point may be identified. The preceding strategic point may be identified, for example, by the PTS-to-index mapping module 220. In embodiments, the preceding strategic point may be identified based on an index number associated with the strategic point located within the metadata file, or the preceding strategic point may be identified based upon the previous strategic point index value extracted from the metadata file. For example, the previous strategic point index value may indicate the index number of the strategic point preceding the identified strategic point. After the preceding strategic point is identified, information may be extracted from the preceding strategic point at 520.

If, at 530, the determination is made that a preceding strategic point does not exist within the metadata file, the process 500 may end at 540.

Figure 6:
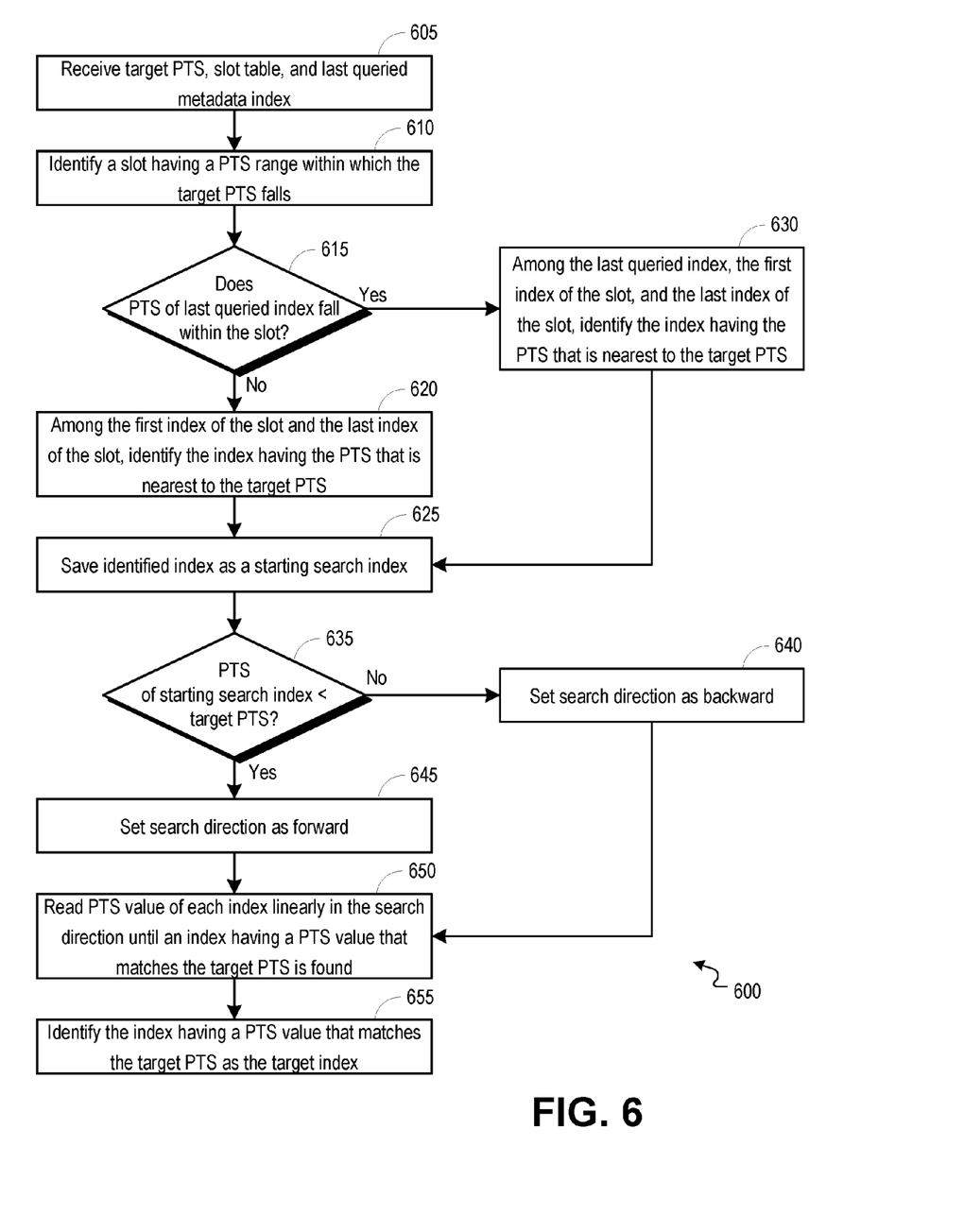
FIG. 6 is a flowchart illustrating an example process operable to facilitate the navigation of a piece of content during a trickplay operation.

FIG. 6 is a flowchart illustrating an example process 600 operable to facilitate the navigation of a piece of content during a trickplay operation. The process 600 may begin at 605 when a target PTS, slot table, and last queried metadata index is received. The target PTS, slot table, and last queried metadata index may be received/retrieved, for example, by the PTS-to-index mapping module 220 of FIG. 2. In embodiments, the target PTS (a targeted resume point) may be received at the PTS-to-index mapping module 220 as part of a trickplay request, and the slot table and last queried metadata index may be retrieved as data stored in support of the playback of a piece of content that is being processed by a multimedia device 110 of FIG. 1. For example, the slot table and the last queried metadata index may be available at a processing module of the multimedia device 110 (e.g., content processing module 210 of FIG. 2). The slot table may include one or more slot entries, wherein each slot entry includes a slot number, an identification of a first and last index of the slot, an identification of a PTS value associated with the first index of the slot, an identification of the PTS value associated with the last index of the slot, and/or other information.

At 610, a slot having a PTS range within which the target PTS falls may be identified. The slot may be identified, for example, by the PTS-to-index mapping module 220. In embodiments, the PTS-to-index mapping module 220 may compare the target PTS to the PTS ranges identified within the slot table and may identify the slot having a first PTS and a last PTS between which the target PTS falls.

At 615, a determination may be made whether the PTS of the last queried index falls within the identified slot. The determination may be made, for example, by the PTS-to-index mapping module 220. In embodiments, the PTS-to-index mapping module 220 may retrieve the PTS of the last queried index from the received/retrieved last queried metadata index, and the PTS-to-index mapping module 220 may compare the PTS of the last queried index to the PTS range associated with the identified slot.

If, at 615, the determination is made that the PTS of the last queried index does not fall within the identified slot, the process 600 may proceed to 620. At 620, the index having the PTS that is nearest to the target PTS may be identified from among the first index of the slot and the last index of the slot. The index having the PTS nearest to the target PTS may be identified, for example, by the PTS-to-index mapping module 220. In embodiments, the PTS-to-index mapping module 220 may compare the target PTS to each of the first PTS value of the identified slot and the last PTS value of the identified slot, and the PTS-to-index mapping module

220 may identify the PTS value that is nearest to the target PTS. The index associated with the identified PTS value that is determined to be nearest to the target PTS may be saved as a starting search index at 625.

Returning to 615, if the determination is made that the PTS of the last queried index falls within the identified slot, the process 600 may proceed to 630. At 630, the index having the PTS that is nearest to the target PTS may be identified from among the last queried index, the first index of the slot, and the last index of the slot. The index having the PTS nearest to the target PTS may be identified, for example, by the PTS-to-index mapping module 220. In embodiments, the PTS-to-index mapping module 220 may compare the target PTS to each of the PTS value associated with the last queried index, the first PTS value of the identified slot, and the last PTS value of the identified slot, and the PTS-to-index mapping module 220 may identify the PTS value that is nearest to the target PTS. The index associated with the identified PTS value that is determined to be nearest to the target PTS may be saved as a starting search index at 625.

At 635, a determination may be made whether the PTS value of the starting search index is less than the target PTS. The determination may be made, for example, by the PTS-to-index mapping module 220. In embodiments, the PTS-to-index mapping module 220 may compare the target PTS to the PTS value associated with the index that is saved as the starting search index.

If, at 635, the determination is made that the PTS value of the starting search index is not less than the target PTS, the process 600 may proceed to 640. At 640, a search direction may be set in the backward direction (e.g., the direction in which the values of presentation time stamps associated with indexes are decreasing). In embodiments, the PTS-to-index mapping module 220 may initiate a search for an index having a PTS value that matches the target PTS. The search may be initiated at the starting search index and may proceed backward from the starting search index (i.e., in the direction of an index preceding the starting search index within the range of indexes of the identified slot).

If, at 635, the determination is made that the PTS value of the starting search index is less than the target PTS, the process 600 may proceed to 645. At 645, a search direction may be set in the forward direction (e.g., the direction in which the values of presentation time stamps associated with indexes are increasing). In embodiments, the PTS-to-index mapping module 220 may initiate a search for an index having a PTS value that matches the target PTS. The search may be initiated at the starting search index and may proceed forward from the starting search index (i.e., in the direction of an index following the starting search index within the range of indexes of the identified slot).

At 650, the PTS value of each of one or more indexes may be read linearly in the search direction until an index having a PTS value that matches the target PTS is found. The PTS value(s) may be read, for example, by the PTS-to-index mapping module 220. The PTS-to-index mapping module 220 may read the starting search index to determine a PTS value associated with the starting search index, and the PTS-to-index mapping module 220 may compare the target PTS to the PTS value of the starting search index. If the PTS value of the starting search index does not match the target PTS, the PTS-to-index mapping module 220 may identify a next index, wherein the next index is the index adjacent to the starting search index in the search direction as set at 640 or 645. The PTS-to-index mapping module 220 may then read the next index to determine a PTS value associated with the next index, and the PTS-to-index mapping module 220 may compare the target PTS to the PTS value of the next index. The PTS-to-index mapping module 220 may continue to read each of one or more indexes following the starting search index and the next index linearly (i.e., sequentially) in the search direction until an index is found that has a PTS value matching the target PTS.

At 655, the index having a PTS value that matches the target PTS may be identified as the target index. The index may be identified as the target index, for example, by the PTS-to-index mapping module 220. In embodiments, the multimedia device 110 (e.g., the content processing module 210 of FIG. 2) may use the identification of the target index (and the metadata associated with the target index) to fetch a frame of the piece of content that is associated with the target PTS. For example, using the metadata associated with the target index, the content processing module 210 may fetch a correct frame from storage (e.g., content storage 205 of FIG. 2) for presentation to a viewer.

Figure 7:
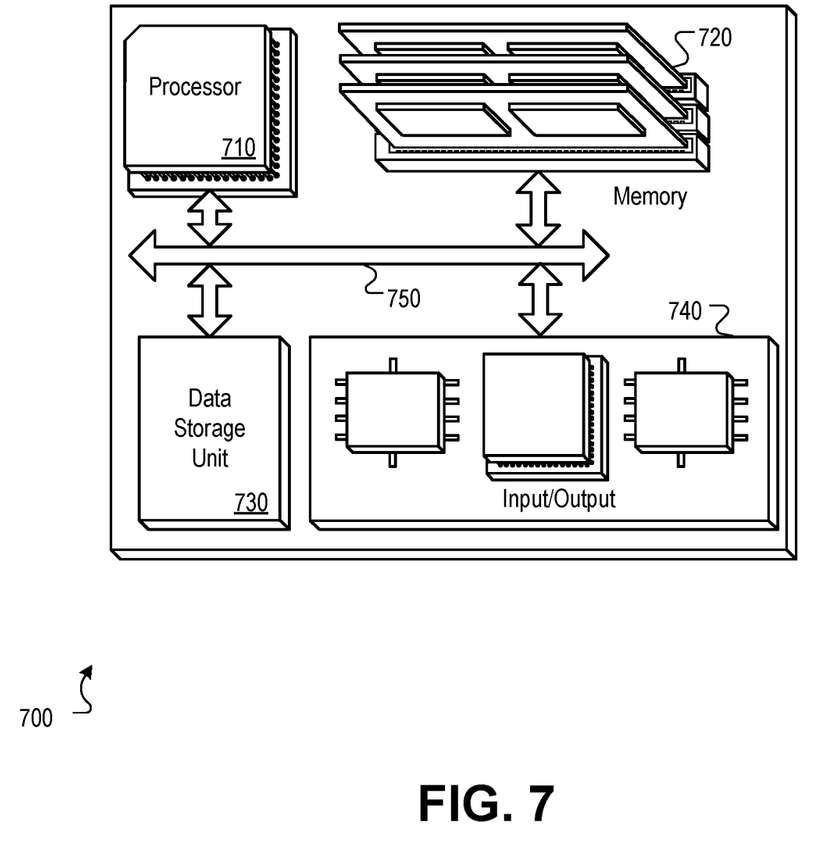
FIG. 7 is a block diagram of a hardware configuration operable to facilitate the detection and use of stitch points during trickplay navigation of a content stream.

FIG. 7 is a block diagram of a hardware configuration 700 operable to facilitate the detection and use of stitch points during trickplay navigation of a content stream. The hardware configuration 700 can include a processor 710, a memory 720, a storage device 730, and an input/output device 740. Each of the components 710, 720, 730, and 740 can, for example, be interconnected using a system bus 750. The processor 710 can be capable of processing instructions for execution within the hardware configuration 700. In one implementation, the processor 710 can be a single-threaded processor. In another implementation, the processor 710 can be a multi-threaded processor. The processor 710 can be capable of processing instructions stored in the memory 720 or on the storage device 730.

The memory 720 can store information within the hardware configuration 700. In one implementation, the memory 720 can be a computer-readable medium. In one implementation, the memory 720 can be a volatile memory unit. In another implementation, the memory 720 can be a non-volatile memory unit.

In some implementations, the storage device 730 can be capable of providing mass storage for the hardware configuration 700. In one implementation, the storage device 730 can be a computer-readable medium. In various different implementations, the storage device 730 can, for example, include a hard disk device, an optical disk device, flash memory or some other large capacity storage device. In other implementations, the storage device 730 can be a device external to the hardware configuration 700.

The input/output device 740 provides input/output operations for the hardware configuration 700. In one implementation, the input/output device 740 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video and/or data services to a central or access device (e.g., multimedia device 110 of FIG. 1 such as an access point, gateway device, STB, DVR or other content storage device, cable modem, router, wireless extender, or other access device) or client device 120 of FIG. 1 (e.g., STB, computer, television, tablet, mobile device, etc.). In another implementation, the input/output device can include driver devices configured to send communications to, and receive communications from one or more networks (e.g., WAN 140 of FIG. 1, local network 130 of FIG. 1, provider network 150 of FIG. 1, etc.).

Those skilled in the art will appreciate that the invention described herein provides methods and systems for navigating content during a trickplay operation. Methods, systems, and computer readable media described herein may facilitate the detection and use of stitch points during trickplay navigation of a content stream. A multimedia device may automatically detect stitch points in a transport stream based upon PTS (presentation time stamp) discontinuities. The multimedia device may generate a slot table that organizes the frames of a piece of content into segments having sequential or linear PTS values. The multimedia device may compare a target PTS to the various PTS ranges of the slot table to identify a region to be searched for a metadata index associated with the target PTS. Once the target PTS is mapped to the appropriate metadata index, the multimedia device may fetch the appropriate frame for presentation.

Described herein is an approach for automatic stitch point detection in a transport stream while recording, and using the stitch point detections during trickplay navigation. The methods and systems described herein allow a non-sequential, recorded stream to be quickly searched such that desired video is presented fast. Moreover, search latency during multiple trickplay is minimized, and CPU (central processing unit) usage is reduced due to the reduced region within which metadata is searched.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

We claim:

1. A method comprising:
   receiving a target presentation time stamp, wherein the target presentation time stamp is received by a multimedia device;
   identifying a slot entry of a slot table, the slot entry having a presentation time stamp range within which the target presentation time stamp falls, wherein each slot entry of the slot table is created by the multimedia device based upon an identification of one or more discontinuities between presentation time stamp values of consecutive content frames;

among a first index of the identified slot entry and the last index of the identified slot entry, identifying the index that is associated with a presentation time stamp value that is nearest to the target presentation time stamp;

based on the value of the target presentation time stamp relative to the value of the presentation time stamp associated with the identified index, determining a direction for carrying out a search of one or more indexes of the slot entry;

comparing the target presentation time stamp to one or more presentation time stamps associated with one or more indexes of the identified slot entry starting with the identified index and proceeding sequentially from the identified index in the determined direction until an index having a presentation time stamp matching the target presentation time stamp is found; and identifying the index having the presentation time stamp that matches the target presentation time stamp as a target index, wherein the multimedia device uses the identified target index to fetch a frame of a piece of content that is associated with the target presentation time stamp.

2. The method of claim 1, wherein determining a direction for carrying out the search of one or more indexes of the slot entry comprises:

if the target presentation time stamp is not greater than the presentation time stamp associated with the identified index, comparing the target presentation time stamp to one or more presentation time stamps associated with one or more indexes of the identified slot entry starting with the identified index and proceeding sequentially from the identified index in a direction in which presentation time stamps of indexes are decreasing until an index having a presentation time stamp matching the target presentation time stamp is found; and if the target presentation time stamp is not less than the presentation time stamp associated with the identified index, comparing the target presentation time stamp to one or more presentation time stamps associated with one or more indexes of the identified slot entry starting with the identified index and proceeding sequentially from the identified index in a direction in which presentation time stamps of indexes are increasing until an index having a presentation time stamp matching the target presentation time stamp is found.

3. The method of claim 1, further comprising:
retrieving a frame for presentation, the frame being associated with the index identified as the target index.

4. The method of claim 1, wherein the slot table comprises a plurality of slot entries, wherein each respective one slot entry of the plurality of slot entries comprises information associated with one or more metadata file indexes that are between a strategic point and another strategic point or content boundary.

5. The method of claim 4, wherein the at least one strategic point is identified as a strategic point index within the metadata file.

6. The method of claim 5, wherein the strategic point is recognized when a discontinuity in presentation time stamp values occurs.

7. The method of claim 5, wherein the strategic point index comprises an identification of a presentation time stamp value associated with a preceding frame, a presentation time stamp value associated with a following frame, and an identification of the location of a previous strategic point index within the metadata file.

8. The method of claim 1, further comprising:
determining that a presentation time stamp value of a last queried index falls within the presentation time stamp range associated with the identified slot entry; and wherein the index that is associated with a presentation time stamp value that is nearest to the target presentation time stamp is identified from among the last queried index, a first index of the identified slot entry, and the last index of the identified slot entry.

9. One or more non-transitory computer readable media having instructions operable to cause one or more processors to perform the operations comprising:

receiving a target presentation time stamp, wherein the target presentation time stamp is received by a multimedia device;

identifying a slot entry of a slot table, the slot entry having a presentation time stamp range within which the target presentation time stamp falls, wherein each slot entry of the slot table is created by the multimedia device based upon an identification of one or more discontinuities between presentation time stamp values of consecutive content frames;

among a first index of the identified slot entry and the last index of the identified slot entry, identifying the index that is associated with a presentation time stamp value that is nearest to the target presentation time stamp;

based on the value of the target presentation time stamp relative to the value of the presentation time stamp associated with the identified index, determining a direction for carrying out a search of one or more indexes of the slot entry;

comparing the target presentation time stamp to one or more presentation time stamps associated with one or more indexes of the identified slot entry starting with the identified index and proceeding sequentially from the identified index in the determined direction until an index having a presentation time stamp matching the target presentation time stamp is found; and identifying the index having the presentation time stamp that matches the target presentation time stamp as a target index, wherein the multimedia device uses the identified target index to fetch a frame of a piece of content that is associated with the target presentation time stamp.

10. The one or more non-transitory computer-readable media of claim 9, wherein determining a direction for carrying out the search of one or more indexes of the slot entry comprises:

if the target presentation time stamp is not greater than the presentation time stamp associated with the identified index, comparing the target presentation time stamp to one or more presentation time stamps associated with one or more indexes of the identified slot entry starting with the identified index and proceeding sequentially from the identified index in a direction in which presentation time stamps of indexes are decreasing until an index having a presentation time stamp matching the target presentation time stamp is found; and if the target presentation time stamp is not less than the presentation time stamp associated with the identified index, comparing the target presentation time stamp to one or more presentation time stamps associated with one or more indexes of the identified slot entry starting with the identified index and proceeding sequentially from the identified index in a direction in which presentation time stamps of indexes are increasing until an index having a presentation time stamp matching the target presentation time stamp is found.

11. The one or more non-transitory computer-readable media of claim 9, wherein the instructions are further operable to cause one or more processors to perform the operations comprising:
retrieving a frame for presentation, the frame being associated with the index identified as the target index.

12. The one or more non-transitory computer-readable media of claim 9, wherein the slot table comprises a plurality of slot entries, wherein each respective one slot entry of the plurality of slot entries comprises information associated with one or more metadata file indexes that are between a strategic point and another strategic point or content boundary.

13. The one or more non-transitory computer-readable media of claim 12, wherein the at least one strategic point is identified as a strategic point index within the metadata file.

14. The one or more non-transitory computer-readable media of claim 13, wherein the strategic point is recognized when a discontinuity in presentation time stamp values occurs.

15. The one or more non-transitory computer-readable media of claim 9, wherein the instructions are further operable to cause one or more processors to perform the operations comprising:
determining that a presentation time stamp value of a last queried index falls within the presentation time stamp range associated with the identified slot entry; and
wherein the index that is associated with a presentation time stamp value that is nearest to the target presentation time stamp is identified from among the last queried index, a first index of the identified slot entry, and the last index of the identified slot entry.

* * * * *